May 27, 1969

S. H. DURBIN 3,447,079

MONITORING CIRCUIT FOR SEQUENTIALLY TESTING HOT SIZING
PRESS RESISTANCE HEATERS CONNECTED IN PAIRS
DURING ENERGIZATION OF THE MATE HEATER

Filed June 17, 1965

INVENTOR.
STANLEY H. DURBIN

BY

*Tilberry & Body*

INVENTOR.
STANLEY H. DURBIN
BY
Tilberry & Body

INVENTOR.
STANLEY H. DURBIN
BY
Tilberry & Body

United States Patent Office 3,447,079
Patented May 27, 1969

3,447,079
MONITORING CIRCUIT FOR SEQUENTIALLY
TESTING HOT SIZING PRESS RESISTANCE
HEATERS CONNECTED IN PAIRS DURING
ENERGIZATION OF THE MATE HEATER
Stanley H. Durbin, Knoxville, Tenn., assignor to E. W.
Bliss Company, Canton, Ohio, a corporation of
Delaware
Filed June 17, 1965, Ser. No. 464,693
Int. Cl. G01r 15/12, 31/02; H05b 3/02
U.S. Cl. 324—73
10 Claims

ABSTRACT OF THE DISCLOSURE

A monitoring circuit for resistance heaters enclosed within a platen of a hot sizing press, wherein a plurality of heaters, two heaters connected in series and the series connected heaters mounted in a delta or Y configuration to a three-wire power source, are individually tested for an open condition by testing across the other series connected resistor by means of collector contacts driven by the shaft of a stepping switch. Each step of a bank of contacts associated with the stepping switch is connected across an individual heater, and the stepping switch will stop stepping when an open heater is sensed, and a numerical counting device, advanced concurrently with the advancing stepping switch, will identifiy the individual heater detected to be open.

---

This invention pertains to the art of shaping high strength metal workpieces and more particularly to a press having electrically heated dies for shaping a workpiece under conditions of heat and pressure.

The invention will be described with reference to what is commonly referred to as a hot sizing press in which a plurality of resistance heating elements are used to heat the dies of the press and specifically refers to an electrical checking device associated with the press installation for identifying the presence and location of any burned out heaters, however, it will be appreciated that the invention is not limited to this application but may be used in other situations where it is difficult to detect and locate the presence of defective electrical elements in a circuit network.

The use of high alloy sheet steels and titanium metal skins is prevalent in the aerospace industry. Cold forming of these metal shapes is usually not feasible. Instead, hot shaping or sizing in especially designed presses is necessary in order to meet the strict aerospace specifications imposed and prevent undesirable stresses in the fabricated structure.

Basically a hot sizing press installation includes right and left hand lower carriage platens each of which can be rolled into and out of the press with a die set and secured below the reciprocal upper platen of the press. When one platen is in the press, the other is alongside in a heating oven where die temperature is maintained. The platens and ovens are heated by a plurality of rod-type resistance heaters, which in the case of the upper and lower platens, extend transversely adjacent the upper and lower dies. If one or more of the heaters burn out, a local cold spot results which is detrimental to the sizing operation. Thus, in order to maintain the proper heat distribution, it is necessary to replace heaters before too many burn out. This is not as simple a task as it may appear since several hundred resistant heaters are involved, which for the most part, are embedded in the platens or otherwise inaccessible which prevents testing by conventional means in order to locate a defective heater.

A solution to this problem requires a direct reading, automatic testing device which can quickly check the entire network of heaters and identify the presence and location of any defective heaters in the group.

Conventional meter-type, direct reading test panels would involve the use of several hundred meters at a prohibitive cost. Moreover the operator's time would be consumed in visually scanning the large array of meter dials which would become a tedious chore in view of the number of resistance heaters in the hot sizing press installation.

The present invention overcomes these and other disadvantages by providing a direct reading, automatic burned out heater identifier which samples each heater in a numerical sequence giving a visual signal of any defective heater in the network according to its place in the numerical series.

In accordance with the broadest aspects of the invention the burned out heater identifier includes a stepping switch having a plurality of banks of rotary collectors driven on a common shaft and electrically connected to a heater network, the heaters being electrically connected in series pairs with each other so that current flow across one heater will indirectly provide a signal determining whether or not the companion heater is burned out and counting means associated with the stepping switch for receiving the signal and identifying in numerical sequence each heater being tested.

Further in accordance with the invention, where the number of heaters to be tested exceeds the number of signal points available on one revolution of the stepping switch, a control relay circuit is provided for switching to separate stepping switch banks making a second revolution possible so as to carry the count to a higher number.

The principal object of the invention is to provide a high speed, reliable, direct reading heater identifier which can be periodically operated to check for the presence of defective heaters in a hot sizing press installation.

A further object of the invention is to provide an automatic testing instrument which will register in numerical sequence each electrical element being tested and provide a visual indication of any defective element in the numerical series.

These and other objects will become apparent from the following description and drawings wherein.

Figure 1:
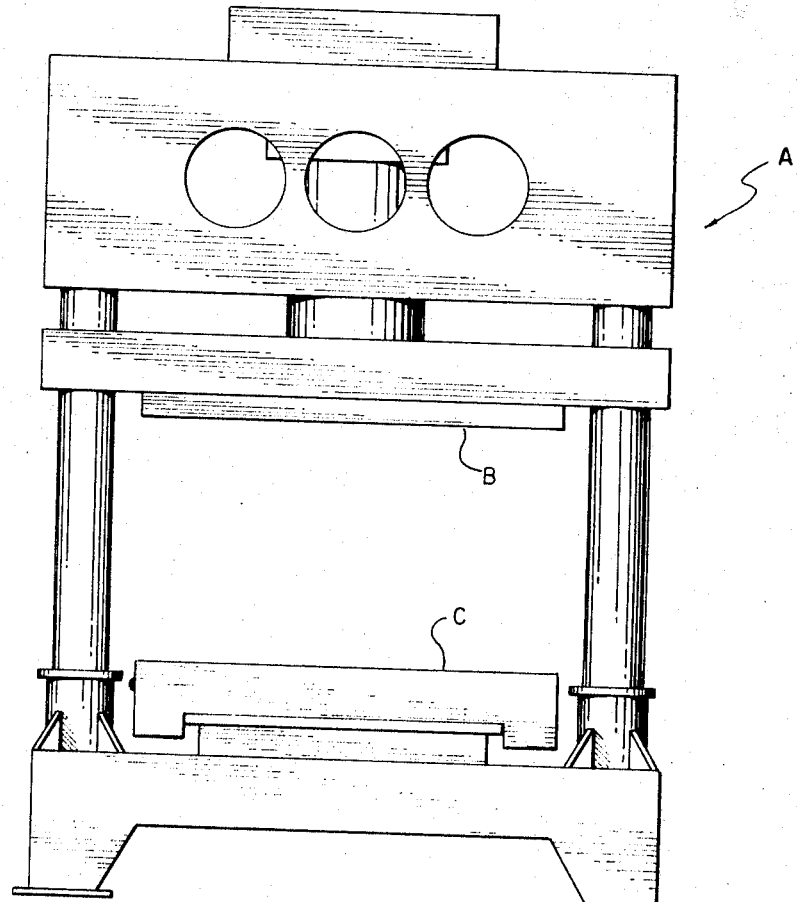
FIGURE 1 is a schematic elevational view depicting a hot sizing press incorporating the invention.

Referring now to the drawings wherein the figures are for the purpose of illustrating a preferred embodiment of the invention only and not for the purpose of limiting same, FIGURE 1 shows a hot sizing press A having an hydraulically actuated upper platen B adapted to reciprocate relative to a lower platen C. It should be appreciated that dies would be carried by each platen for the purpose of shaping a workpiece and that, in the actual case, lower platen C would be mounted on a carriage for moving a die set into and out of the press from an adjacent heating oven where the dies are kept hot while outside of the press and that a duplicate over and lower platen arrangement would be employed on the opposite side of the press so as to obtain maximum utilization of the press and dies. However, for purposes of description, reference will be made only to lower platen C and it should be understood that the invention would apply equally to the other heated portions of the press installation including the upper platen and right and left hand heating ovens.

Figure 2:
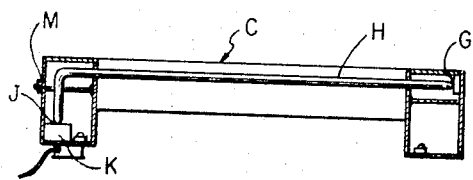
FIGURE 2 is a cross-sectional view of the lower platen of the hot sizing press of FIGURE 1 showing the placement of heaters therein.
Figure 3:
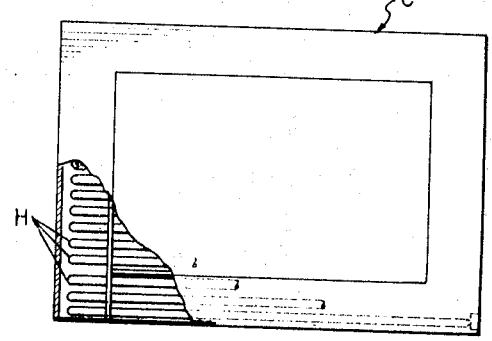
FIGURE 3 is a cut away plan view of the lower platen shown in FIGURE 2.

Referring now to FIGURES 2 and 3, the upper surface of the lower platen C is heated by a plurality of rod-type resistant heaters H extending through and transversely below the die support surface of platen C. While only a few heaters H are illustrated in the actual case as many as 96 may be installed. Each heater H is provided with a plug-in connection G at one end and is adapted to make contact at the other end J with a terminal box K. If a heater H is burned out, a panel M on the side of the platen C may be removed to gain access to the ends J of the bank of heaters so that any defective heaters can be replaced. A continual check must be maintained of the condition of each heater in order to insure proper heat distribution over the surface of the platen. Thus it is necessary to replace heaters as they burn out to prevent the development of local cold spots.

Figure 4:
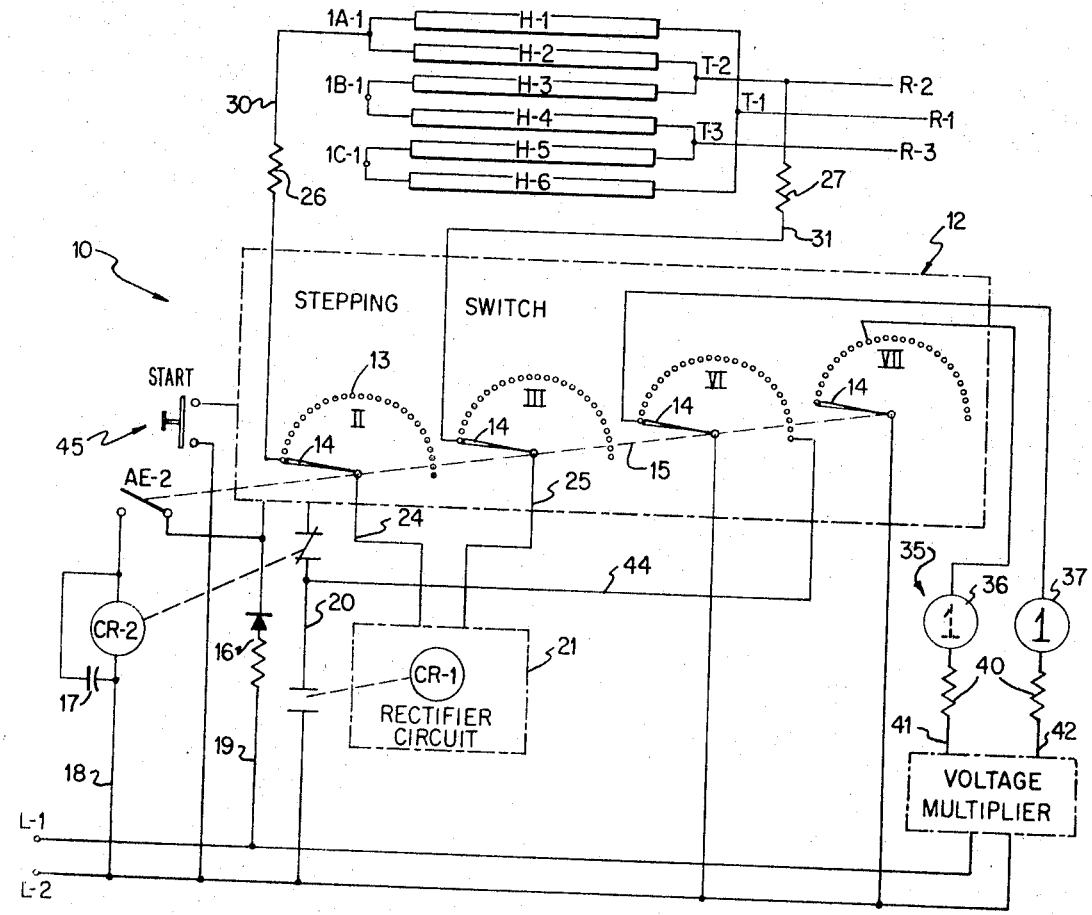
FIGURE 4 is an electrical schematic of the burned out heater identifier associated with the lower platen of FIGURES 2 and 3.
Figure 5:
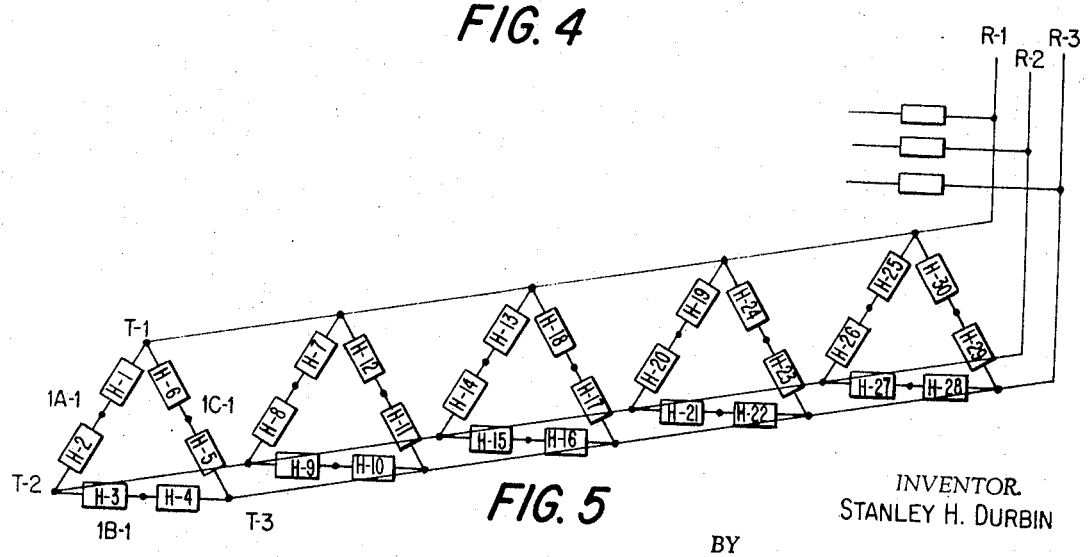
FIGURE 5 is a network diagram of the resistance heating elements of the lower platen.

In order to detect and locate defective heaters, an automatic burned out heater identifier 10 is provided as represented in the electrical schematic in FIGURE 4. The identifier shown has a capacity to check up to 25 heaters but as explained hereinafter, this basic circuit may be modified to carry the count higher. For simplicity, only heaters H1 through H6 are represented in FIGURE 4, however, all the heaters are connected in a network of delta groups as shown in FIGURE 5. It is important to note that two heaters are paired on each leg of each delta grouping and connected in electrical series relationship. That is, heater H1 is connected to power line R1 at T1 and to heater H2 at 1A1 which latter heater is connected to power line R2 at T2 and so on throughout the heater network. Instead of delta connections, a Y connection of the heaters may be employed, however in either case it is essential that two heaters be paired in series on each leg of the delta or Y grouping.

The burned out heater identifier 10 consists essentially of an automatic stepping switch 12 shown here for purposes of illustration as having four collector banks II, III, VI and VII with a semicircular array of 26 pins, 13 arranged on each bank and adapted to be successively engaged by collectors 14 of each bank. The collectors 14 are all driven on a common drive shaft 15. The stepping speed of switch 12 is controlled by relay CR2 which is a DC relay operated from the stepping switch rectifier 16 and includes a shading coil which gives a slight delay to the release of the armature. To further delay release, a condenser 17 is connected across relay CR2 in line 18 so that the relay CR2 and associated condenser controls the stepping speed to approximately eight steps per second. Switch AE2 is operated from the stepping switch shaft 15 as indicated by the extension of the dashed line representing shaft 15 in FIGURE 4 and will energize normally closed relay CR2 to the open position with each indexing movement of collectors 14 thus de-energizing the stepping switch motor coil between each step. CR2 is also connected in line 20 in series with relay CR1 which latter relay is operated by the AC test signal obtained from the three phase heater power lines R1, R2, R3, rectified so that the relay will operate on a wide range of voltage. The test signal which operates relay CR1 is picked off at the stepping switch pins 13 of banks II and III and fed to a double wave rectifier 21 through lines 24, 25. All test signals enter the instrument through current limiting resistors 26, 27 in test lines 30, 31. The test signal is less than ⅛ second duration due to the control function of relay CR2 on the stepping switch. CR1 is an AC relay with a shading coil similar to relay CR2 to obtain a slight delay in the release of the armature which prevents cycling between signals, however, not enough delay so as not to release on no signal. That is, the characteristics of CR1 are such that the armature does not lift while the stepping switch is passing from one signal to another (double break-non overlapping contacts) yet it will lift and open is contacts if no signal is present. Thus the CR1 armature will remain closed completing the circuit through lines 19 and 20 as the stepping switch is being indexed between pins 13 but if no signal is present on the next pin of banks II and III, the armature will lift breaking off current to the stepping switch motor coil and stopping the instrument on the dead pins. On the other hand, if a signal is present, then the armature will not lift and the stepping switch will be stepped ahead until a burned out heater is located.

In accordance with the invention, the test signal is obtained by testing across each heater and thereby determining the operability of its series connected companion heater. For example, referring to FIGURE 5, if neither heater in one load branch of a delta group is burned out, half the voltage drop across T1 to T2 will occur between T1 to 1A1 and T2 to 1A1. If heater H1 is burned out, full voltage will occur across T1 to 1A1 but no voltage across its mating heater 1A1 to T2. Thus no signal across any given heater indicates its companion heater is burned out. CR1 must operate on a comparatively low voltage when the heater being tested is good but yet not be affected by the maximum voltage when connected across a burned out heater. It should be noted that this method of testing determines nothing about the heater across which the lines are actually connected.

Referring now to FIGURE 4 in particular, heater H1 is tested to see if it is burned out as explained by connecting the test lines 30, 31 at points 1A1 and T2 respectively across heater H2. If heater H1 is burned out no signal will be received by lines 30, 31 which means the first pin contacts 13 of banks II and III of the stepping switch 12 will be dead and the armature of CR1 will open so that the stepping switch will not be indexed to the next set of pins. On the other hand, if a signal is present, indicating heater H1 is good, then the collectors 14 will pick off the signal energizing relay CR1 through the double wave rectifier circuit 21 maintaining CR1 and completing the circuit through lines 19, 20 causing the stepping switch 12 to advance to the next set of pins. The second set of pins sample across heater H1 between 1A1 and T1 and if heater H2 is burned out then no signal will be present at these contacts and the armature of CR1 will open breaking the circuit 19, 20 which drives the stepping switch. On the other hand, if heater H2 is good, then CR1 armature will remain closed and the stepping switch will be driven to the third set of pins 13 and so on, until all the available pins on both the banks II and III of the stepping switch have been used in the test.

Visual identification of the heater being tested is provided by a numerical counting device 35 consisting essentially of a pair of counting tubes 36, 37 which contain filaments bent in the shape of the numerals 1 through 9 and 0. The filaments are wired to separate tube socket connections so that it is possible to energize separate filaments in sequence thus illuminating consecutively the integers 1, 2, 3 and so on. Counting tubes 36, 37 are connected through appropriate current limiting resistors 40 to terminals 41, 42 of a DC voltage doubling and rectifier circuit 43 powered by control power lines L1, L2 of 115 volt AC, 60 cycle current. The counting device 35 is controlled from switching banks VI and VII, the collectors 14 of which advance uniformly with the collectors 14 of banks II and III.

Figure 6:
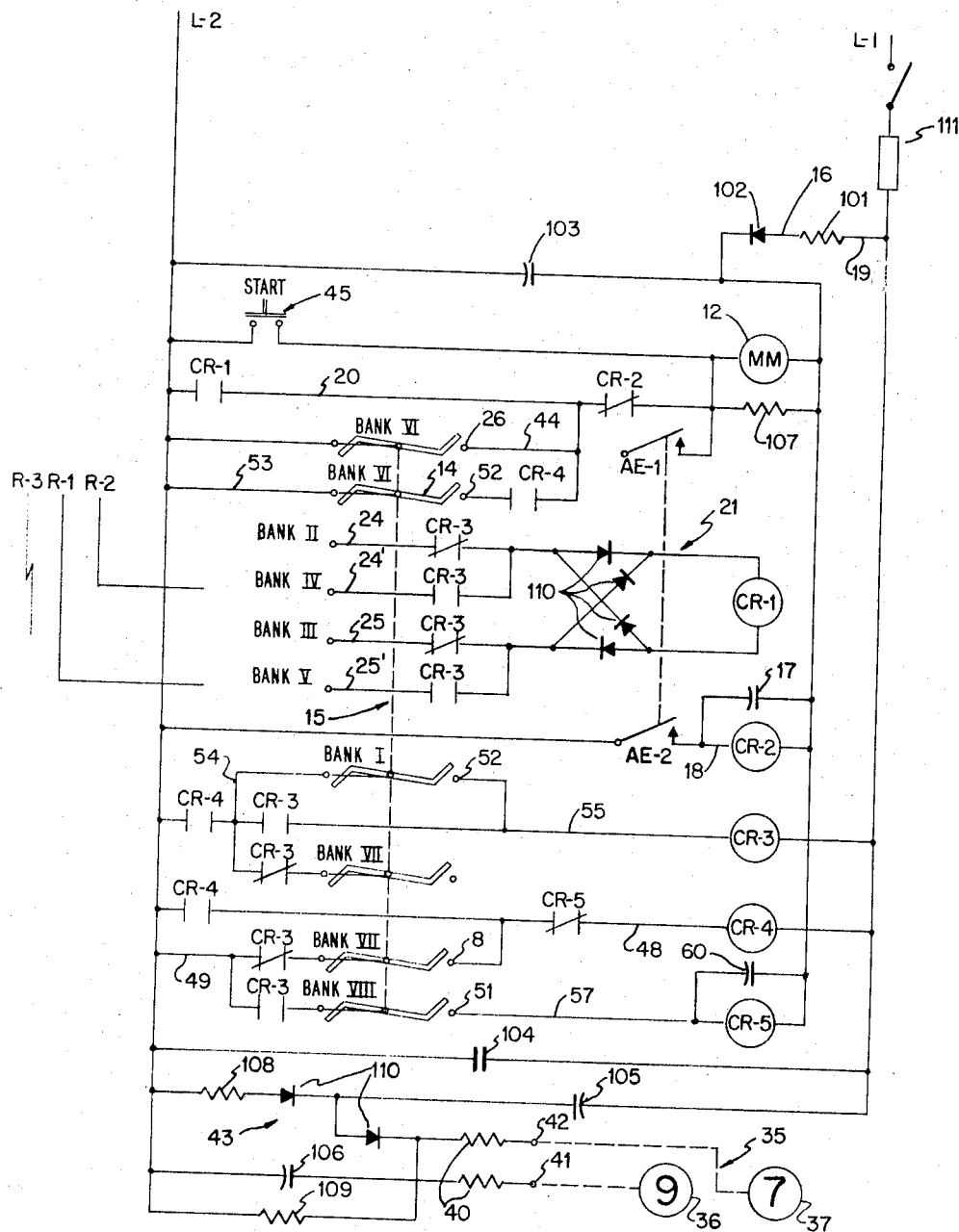
FIGURE 6 is an electrical schematic of the burned out heater identifier similar to the schematic in FIGURE 4 but modified to permit two revolutions of the stepping switch.

All the relays and stepping switch operate from 115 volts, AC 60 cycle power with the exception of relay CR1 which is operated by the test signal. In operation, the operator depresses the start button 45 advancing the collectors 14 of all the banks to the first set of pins 13. If heater H1 is burned out these pins will be dead, CR1 will open stopping the stepping switch 12 and the numeral 1 will be lighted in tube 37 identifying for the operator the fact that heater H1 is defective. After noting this fact, the operator again presses start button 45 advancing all of the stepping switch collectors 14 to the second pin 13 of each bank so as to test the condition of heater H2. If heater H2 is good, than relay CR1 will be maintained causing the stepping switch to advance all the collectors 14 automatically to the next pin and so on. While under automatic advance (no burned out heaters being present) switch bank VI will energize filaments of counting tube 37, lighting numerals 1 through 9 consecutively. When the stepping switch collectors have advanced to the number 10 pin, bank VII will energize counting tube 36 to display the numeral 1 as shown in dotted lines in FIGURE 4, and bank VI will energize counting tube 37 to display a zero, signifying that heater H10 is being tested. The next nine pins of switch bank VII are wired together so that the numeral 1 remains lighted in tube 36 while the count proceeds to heater H19, then the numeral 2 is lighted in tube 36 and so on. For simplicity, only the first 180 degrees of pins of each bank of the stepping switch 12 are shown in FIGURE 4. However, in the actual case there would be a full circle of pins for a total of 52. On the first half revolution heaters H1 through H25 are tested. The number 26 pin on each bank is blank except for bank VI, the latter bank's pin number 26 being effective to connect the stepping switch motor coil to line power through line 44 stepping the switch ahead to the next position to test heaters H26 through H50 on the second half of the first revolution. In the case where the count is to be carried to a higher number, the identifier is modified as shown in FIGURE 6.

Where the number of heaters exceeds the number of pins on each bank available on one revolution of the stepping switch, additional collector banks are provided. The identifier circuit in FIGURE 6 is basically the same as the identifier circuit shown in FIGURE 4 except that additional banks and relays are employed to accomplish the necessary switching to handle the second revolution. In FIGURE 6 the same numerals will be used to indicate the corresponding portion of the circuit shown in FIGURE 4. Eight collector banks of the stepping switch 12 are employed and the collectors 14 of banks I, VI, VII and VIII are represented at a pin which is contacted during the first or second revolution to perform a switching function in the circuit. For testing heaters H1 to H50, the identifier circuit in FIGURE 6 performs exactly as described with respect to FIGURE 4 where banks II and III pick off the signal used to energize relay CR1. Pin number 26 is blank on each of the banks, except bank VI, which pin is engaged at the completion of the first half of the first revolution to connect control power through line 44 and normally closed relay CR2 driving the stepping switch 12 ahead for the second half of the first revolution. During the second half of the first revolution banks II and III continue to feed the test signal to relay CR1 through lines 24, 25. During the first half of the first revolution bank VII collector strikes pin number 8 energizing normally open relay CR4 in line 48 through the normally closed contacts of relay CR3 in line 49 and relay CR5 in line 48. Relay CR4 is a control relay which makes the necessary connections to cause the stepping switch to go through two complete revolutions as will be seen hereinafter. CR4 is now maintained through its own normally open contacts. At the completion of the first revolution, all the stepping switch collectors will be advanced to pin 52 which is blank on each of the banks with the exception of banks I and VI. The collector of bank VI upon striking pin 52 at the completion of the first revolution connects control power through line 53 and now closed relay CR4 to drive the stepping switch 12 to pin 1 at the beginning of the second revolution. At the same time pin 52 of bank I completes the circuit through closed relay CR4, line 54 and line 55 to energize relay CR3 in line 55 opening the test lines 24, 25 used to feed CR1 during the first revolution and simultaneously closing the relays CR3 in the test lines 24', 25' used to feed stepping signals to CR1 during the second revolution. Relays CR3 where shown open, now maintain in the closed position and those shown closed are open through the second revolution and the device proceeds as it did through the first revolution except no special action occurs at pin 8 of bank VII.

Assume that the lower platen C contains 96 heaters and the identifier has been operated through its second revolution with all 96 heaters having been tested and none found defective. The numerals 9 and 7 will be illuminated in the counting tubes 36, 37 respectively indicating that all the heaters in the lower platen are in good order. Power to advance the stepping switch 12 farther comes from heater power lines R1 and R2 which are connected through to the last few blank pins on collector banks IV and V. These pins thus energize relay CR1 stepping the switch 12 out to the end of its cycle. At pin 51 of bank VIII the collector connects control power through line 49, closed relay CR3 and line 57 to energize relay CR5 which in turn de-energizes relay CR4 in line 48. Relay CR5 thus stops the cycle after the second revolution of the stepping switch. Its characteristics with the associated condenser 60 must be that a flash signal will cause it to maintain long enough for relay CR4 to open its contacts. With relay CR4 open, relay CR3 is de-energized which returns it to the normally closed position as shown in FIGURE 6 setting up to the circuit for the next testing cycle. The stepping switch advances to pin 52 and stops since control relay CR4 has dropped out in line 53. To run a second check of the heaters, it is necessary to depress the start button 45 again which repeats the complete test.

From the foregoing it will be seen that the identifier consists of relay systems arranged to sample the voltage across each and every heater in the various platens and ovens of the hot sizing press. If voltage is present across any heater, which signifies the heater in series with this one is good, then the instrument will sample the next heater and so on. As each heater is sampled, a number from 1 to whatever number indicates the maximum number of heaters tested in that section of the press installation, will be displayed by the counter. A burned out heater will cause the identifier to stop thereby displaying the characteristic number of the burned out heater. That number is noted by the operator whereupon he again presses the start button to continue the checking of the heater network. After all heaters of the particular section of the press installation are checked, the counting tubes are not lighted showing that the test is over. The entire test of 96 heaters for example requires no more than 15 seconds if all heaters are good.

For the purpose of providing a more complete description, the following table lists the characteristics of the various components of the identifier circuits shown in FIGURES 4 and 6 however it should be appreciated that other equivalent components may be substituted.

| Circuit components | Characteristic |
|---|---|
| Stepping switch 12 | Eight Bank, 52 point Automatic Electric Corporation Type 45 stepping switch with rectifier for operation on 115 volt direct current from 60 cycle, single phase, 115 volt AC. |
| Condenser 103 | 40 mfd. |
| Condenser 17 | 10 mfd. |
| Condenser 60 | 20 mfd., 150 volt DC. |
| Condenser 104 | .05 mfd., 600 volt DC. |
| Condenser 105 | 40 mfd., 250 volt DC. |
| Condenser 106 | Do. |
| Resistor 107 | 6.8 kilo ohm. |
| Resistor 108 | 33 ohm. |
| Resistor 40 | 82 kilo ohm. |
| Resistor 109 | 0.1 meg. ohm. |
| Resistor 26, 27 | 1.5 kilo ohm. |
| Resistor 101 | 22 ohm. |
| Diode 102 | Rectifier to 115 volt DC. |
| Silicon diodes 110 (6) | 500 MA–400 PIV. |
| Fuse 111 | mth fuse 6 amp. |
| Relay CR1 | AC relay with shading coil and 725 ohm coil. |
| Relay CR2 | Similar to relay CR1 but has 10 microfarad condenser 17 connected across the coil in order to further delay release and is operated by DC from the stepping switch rectifier. |
| Relay CR3 | Used for switching the signals from banks II and III to the signals from banks IV and V during the second revolution of the stepping switch and also switches the input current from bank VII to bank VIII thereby continuing the count above 50. |
| Relay CR4 | A control relay to establish the second revolution of the stepping switch. |
| Relay CR5 | Used to stop the sequence after the second revolution of the stepping switch and associated condenser 60 is for the purpose of maintaining CR5 long enough for CR4 to drop out. |

I claim:

1. A heating system including, in combination, at least one electrically heated platen;
   a network of resistance heaters in said platen, said heaters being arranged in pairs, each heater being in series with a mate heater;
   power supply means across each of said pairs of heaters;
   a burned out heater identifier comprising;
      test signal collector means including pairs of electrical contacts;
      drive means including an electrical circuit for driving said collector means for advancing said pairs of electrical contacts sequentially connecting said pairs of electrical contacts across each heater and then the mate heater;
      output connections for said collector means;
      means responsive to the voltage across said output connections including relay means in said electrical circuit, the voltage condition across said collector means output connections being operative to energize said relay means to advance said collector means and halt said advance when a defective heater is located;
      the presence or absence of a voltage across said output connections being indicative of the condition of the mate heater of that heater across which said test signal collector means is connected;
      heater identifier means for registering the location of each heater as its mate heater is being tested.

2. The heating system of claim 1 wherein said heater identifier means includes electrical contact means mechanically connected with said test signal collector means and actuated therewith for sequential connecting across each heater and then the mate heater.

3. The heating system of claim 1, wherein said resistance heaters are for a hot sizing press including upper and lower electrically heated platens.

4. The heating system of claim 1 wherein said test signal collector means includes a stepping switch comprising a pair of test signal banks, each including a plurality of contacts, each contact on one bank being connected to a contact on the other bank through a heater to provide the pairs of electrical contacts for receiving the signal from each heater,
   said test signal collector means comprising arm means for each bank driven in unison from contact to contact to transmit the individual test signals from each heater.

5. The heating system of claim 4, wherein said heater identifier means comprises at least one additional bank of contacts including an identifier contact for each heater to be tested; separate arm means for said additional bank mechanically driven with said test signal collector arm means; and heater indicating means connected with each said identifier contact.

6. The combination as set forth in claim 5 wherein the contacts on each bank are radially arranged in a circumferentially spaced manner and the collectors are driven from a common rotary shaft.

7. The combination as set forth in claim 6 in which the number of heaters exceeds the number of contacts available on one revolution of the test signal collectors and the stepping switch includes:
   a second pair of test signal banks each having a plurality of contacts, each contact on one bank being connected to a contact on the other bank to provide pairs of contacts for each heater to be tested on the second revolution of the stepping switch,
   test signal collectors for said second pair of test signal banks driven in unison from contact to contact to transmit test signals from the heaters tested on the second revolution, and
   other relay means for disconnecting the first pair of banks at the beginning of the second revolution and simultaneously connecting the second pair of banks to actuate said heater identifier means so as to carry the count to a higher number, said other relay means connected to the first and second pairs of test signal banks.

8. A testing system for a resistance heater network of the type which includes a plurality of heaters, each heater being arranged in pairs with another heater and electrically connected in series with its mate heater; comprising
   voltage responsive signal generating means including a stepping switch comprising a pair of test signal banks, each having a plurality of electrical contacts, each electrical contact of one bank being connected to an electrical contact on the other bank through a heater;
   collector arm means for each of said test signal banks;
   output connections for said collector arm means;
   drive means including an electrical circuit for driving said collector arm means for sequentially connecting pairs of electrical contacts across each heater and and then the mate heater;
   means responsive to the voltage across said output connections including relay means in said electrical circuit, a voltage across said collector arm means output connections being operative to energize said relay means to advance said collector arm means and halt said advance when a defective heater is located;
   the presence or absence of a voltage across the collector arm means output connections being indicative of the condition of the mate heater of that heater across which said collector arm means are connected;
   heater identifier means for registering the location of each heater as its mate heater is being tested.

9. The system of claim 8 wherein a variable voltage AC current is applied across said resistance heater network;
   said signal generating means including an AC to DC current rectifier, said relay means being responsive to the output of said rectifier.

10. A device as set forth in claim 9 wherein the stepping switch includes at least a third bank having a contact for each heater to be tested and separate collector means connected with said third bank driven in unison with the collector arm means to actuate said heater identifier means.

References Cited

UNITED STATES PATENTS

| | | |
|---|---|---|
| 2,523,649 | 7/1947 | Horvitch. |
| 2,983,869 | 5/1961 | Schmidt _____ 324—73 |
| 3,197,695 | 7/1965 | Wingfield _____ 324—73 XR |
| 3,253,220 | 5/1966 | Hordosi _____ 324—73 |

RUDOLPH V. ROLINEC, Primary Examiner.

E. L. STOLARUN, Assistant Examiner.

U.S. Cl. X.R.

324—51, 64; 219—482